(12) United States Patent
Gärtner et al.

(10) Patent No.: US 8,896,468 B2
(45) Date of Patent: Nov. 25, 2014

(54) CONTROL METHOD FOR A ROAD TOLL SYSTEM

(71) Applicant: Kapsch TrafficCom AG, Vienna (AT)

(72) Inventors: Andreas Gärtner, Vienna (AT); Joachim Bäck, Vienna (AT); Oliver Nagy, Vienna (AT)

(73) Assignee: Kapsch TrafficCom AG, Vienna (AT)

( * ) Notice: Subject to any disclaimer, the term of this patent is extended or adjusted under 35 U.S.C. 154(b) by 142 days.

(21) Appl. No.: 13/757,523

(22) Filed: Feb. 1, 2013

(65) Prior Publication Data

US 2013/0201039 A1 Aug. 8, 2013

(30) Foreign Application Priority Data

Feb. 2, 2012 (EP) .................................. 12153628
Sep. 12, 2012 (EP) .................................. 12184051

(51) Int. Cl.
| | |
|---|---|
| *G08G 1/123* | (2006.01) |
| *G07B 15/06* | (2011.01) |
| *G08G 1/00* | (2006.01) |
| *G06Q 30/02* | (2012.01) |
| *G08G 1/052* | (2006.01) |
| *B60Q 9/00* | (2006.01) |
| *G08G 1/017* | (2006.01) |
| *G08G 1/054* | (2006.01) |
| *G08G 1/01* | (2006.01) |
| *G08G 1/015* | (2006.01) |

(52) U.S. Cl.
CPC ............ *G06Q 30/0283* (2013.01); *G07B 15/06* (2013.01); *G08G 1/202* (2013.01); *G08G 1/052* (2013.01); *B60Q 9/00* (2013.01); *G07B 15/063* (2013.01); *G08G 1/0175* (2013.01); *G08G 1/054* (2013.01); *G08G 1/0137* (2013.01); *G08G 1/015* (2013.01); *G08G 1/205* (2013.01)
USPC ............ 340/989; 340/902; 340/928; 340/936

(58) Field of Classification Search
USPC ............ 340/989, 902, 933, 901, 539.11, 905, 340/928, 936, 937, 5.82, 550
See application file for complete search history.

(56) References Cited

U.S. PATENT DOCUMENTS

| | | | |
|---|---|---|---|
| 8,754,781 B2 * | 6/2014 | Leopold et al. | 340/902 |
| 2006/0044161 A1 * | 3/2006 | Feldman et al. | 340/933 |

(Continued)

FOREIGN PATENT DOCUMENTS

| | | |
|---|---|---|
| DE | 3932029 | 6/1990 |
| DE | 102005058033 | 6/2007 |

(Continued)

OTHER PUBLICATIONS

Extended European Search Report dated Jun. 15, 2012 from the European Patent Office.

(Continued)

*Primary Examiner* — Hoi Lau
(74) *Attorney, Agent, or Firm* — Fiala & Weaver P.L.L.C.

(57) ABSTRACT

Control devices and methods for a road toll system that is based on vehicle-based on-board units, using recording vehicles, control vehicles and a violation server, wherein the recording vehicle reads out a toll parameter from the on-board unit of a passing vehicle via a DSRC radio interface, compares it to a shape parameter of the vehicle detected by a sensor, and based thereon, in case of inconsistency, generates a violation data record and transmits it to the violation server, wherein the control vehicle registers the position or surroundings thereof in the violation server, and the violation server makes available to a control vehicle such violation data records, the locations of the violations of which are within the surroundings of a position of the control vehicle, wherein the control vehicle issues an alert message when it detects a violating vehicle in the surroundings, and wherein, during the transmission of a violation data record from the recording vehicle to the violation server and/or from the violation server to the control vehicle, the violation data record is divided into a TCP part and a UDP part.

12 Claims, 6 Drawing Sheets

(56) References Cited

U.S. PATENT DOCUMENTS

| | | | |
|---|---|---|---|
| 2006/0064345 A1 | 3/2006 | Biet | |
| 2006/0066148 A1* | 3/2006 | Nguyen | 307/10.2 |
| 2006/0142933 A1 | 6/2006 | Feng | |
| 2008/0238719 A1* | 10/2008 | Marchasin et al. | 340/901 |
| 2012/0194330 A1* | 8/2012 | Nguyen | 340/426.12 |
| 2013/0142393 A1* | 6/2013 | Lord et al. | 382/105 |
| 2013/0201034 A1* | 8/2013 | Leopold et al. | 340/902 |
| 2013/0201035 A1* | 8/2013 | Leopold et al. | 340/902 |
| 2013/0201038 A1* | 8/2013 | Leopold et al. | 340/989 |
| 2013/0201039 A1* | 8/2013 | Gartner et al. | 340/989 |
| 2013/0342368 A1* | 12/2013 | Nathanson | 340/903 |
| 2014/0036078 A1* | 2/2014 | Nerayoff et al. | 348/148 |
| 2014/0039987 A1* | 2/2014 | Nerayoff et al. | 705/13 |
| 2014/0040028 A1* | 2/2014 | King et al. | 705/14.53 |
| 2014/0068777 A1* | 3/2014 | Piratla et al. | 726/26 |
| 2014/0167954 A1* | 6/2014 | Johnson et al. | 340/539.11 |
| 2014/0195313 A1* | 7/2014 | Nerayoff et al. | 705/13 |

FOREIGN PATENT DOCUMENTS

| | | |
|---|---|---|
| EP | 1170702 | 1/2002 |
| EP | 1783692 | 5/2007 |
| WO | 2004002773 | 4/2004 |
| WO | 2004027730 | 4/2004 |
| WO | 2011103612 | 9/2011 |
| WO | 2011129800 | 10/2011 |

OTHER PUBLICATIONS

Australian Government, Patent Examination Report No. 1, AU App. No. 2013200444, report dated Nov. 8, 2013.

Extended European Search Report mailed Mar. 4, 2013 from the European Patent Office.

Australian Government Patent Examination Report No. 1, Search Information Statement, AU App. No. 2013200478, Kapsch Traffic-Com AG, Nov. 11, 2013.

Extended European Search Report dated Mar. 5, 2013 from the European Patent Office.

* cited by examiner

CONTROL METHOD FOR A ROAD TOLL SYSTEM

CROSS REFERENCE TO RELATED APPLICATIONS

The present application claims the priority of the European patent application no. 12153628.8 of Feb. 2, 2012, and European patent application no. 12184051.6 filed on Sep. 12, 2012, both of which are hereby incorporated by reference herein.

FIELD OF THE INVENTION

Described herein are devices and methods that relate to a control method for a road toll system that is based on on-board units carried by vehicles.

In modern road toll systems, vehicles subject to tolls are equipped with on-board units (OBUs), which can be used to locate the vehicles so as to then charge tolls (fees) for their usage of the road. The OBUs can take on a variety of designs: The OBUs can be of the "self-locating" type, which is to say, they can continually determine the locations thereof themselves, for example by means of a satellite navigation receiver as part of a satellite navigation system (global navigation satellite system, GNSS) and report the locations thus determined ("position fixes") either directly to a back office of the road toll system, be it via a mobile communication network or a network of geographically distributed radio beacons, or in the form of "abstracted" toll transactions, which are calculated based on the reported positions. As an alternative, such GNSS OBUs could simply store the reported positions or toll transactions thereof, or debit the fees calculated based thereon from an internal toll credit account. The OBUs can also be of the "externally located" type, for example using a plurality of toll or radio beacons which are geographically distributed over the road toll system and which establish the respective short range communication or DSRC (dedicated short range communication) with passing OBUs and localize them with respect to the known beacon locations thereof due to the limited communication range. Corresponding reported positions, or toll transactions calculated based thereon, can then be generated by the OBUs or the toll beacons and processed either in the OBUs or in the back office.

SUMMARY

Various embodiments described herein are directed to control methods for ascertaining and enforcing traffic or toll violations in such road toll systems. Some embodiments are configured to make such control methods suitable for use in geographically remote regions that have no, or only insufficient, mobile communication network coverage, so that satellite connections may be employed at least to some extent. Satellite connections have high latency, which can result in deadlock situations with packet-switched data transmission if the sender, because of delayed receipt confirmations, assumes a data packet was lost and resends it; continual resending may be the result, which disrupts the transmission of data.

In some embodiments described herein, a control method for a road toll system is based on on-board units carried by vehicles, using at least one recording vehicle and at least one control vehicle, which can wirelessly communicate with a central violation server, comprising: in the recording vehicle: detecting a traffic or toll violation of an on-board unit or of a vehicle carrying the same and, if a violation exists, transmitting a violation data record, containing a determined location of the violation and a read license plate number of the vehicle, to the violation server; in the violation server: registering control vehicles, including positions or the surroundings thereof, receiving violation data records from recording vehicles and, if the locations of the violations thereof are within the surroundings of a position, providing these violation data records to a control vehicle that is registered with this position or these surroundings; in the control vehicle: registering the position or surroundings thereof in the violation server, reading the license plate number of a license plate of a passing vehicle, determining a violation data record provided by a violation server for a read license plate number and, if such a record exists, issuing an alert message, wherein, during the transmission of a violation data record from the recording vehicle to the violation server and/or from the violation server to the control vehicle, the violation data record is divided into two parts, of which the first part contains at least the location of the violation and the license plate number read result, and the second part contains additional violation data, and the first part is transmitted via a connection-oriented and the second part is transmitted via a connectionless packet-switched transport protocol. In further aspects, the invention creates control devices, recording vehicles, violation servers and control vehicles, which implement the method according to the invention.

Embodiments described herein may be based on the novel approach of a distributed control system, which is composed of a first fleet of recording vehicles ("hunters") and a second fleet of control vehicles ("catchers"), which communicate with each other via a common violation server. The "hunters" are well-equipped for automatic violation detection and are not required to take any further action for violating vehicles than that of generating violation data records; their interactions with the controlled vehicles are brief, and consequently they can move about quickly and even check vehicles traveling at high speed or in opposing traffic, and their number can be kept low, whereby the overall equipment costs are contained. The "catchers" require comparatively little equipment because they do not ascertain violations, but only read vehicle license plate numbers, search for associated violation data records and issue alerts for violating vehicles. The crew of the control vehicle can then, for example, stop the violating vehicle and conduct a local manual check. Because of the low equipment requirements, control vehicles (catchers) can be provided in large numbers and can thus also specifically conduct time-consuming local inspections. For example, existing fleets of special-purpose vehicles, such as emergency vehicles, means of public transportation, taxis and the like, can be converted into control vehicles and perform the control functions thereof in mobile fashion in moving traffic, and in stationary fashion in stopped traffic, while a few complex recording vehicles (hunters) continually move through moving traffic in a highly mobile fashion and generate violation data records. As a result, automatic controls of on-board units themselves can be carried out even in large, broadly branched road systems that contain high-speed and opposing traffic routes.

By dividing the violation data record when transmitting the same, the method is suitable for high-latency wireless connections between the violation server, recording and control vehicles, in particular for satellite transmissions. The first data part, which is critical for picking up violating vehicles and contains the location of the violation and the license plate number read result, is very short, typically less than 100 bytes in size, and can thus be rapidly and reliably transmitted via a connection-oriented transport protocol. The second data part, which contains the remaining data of the violation data record, can have a large data volume, in particular if it contains images for evidence, and can also be delivered over high-latency transmission networks, such as satellite communication systems, by dividing it into small data packets, which are transmitted via a connectionless, unconfirmed transport protocol.

It shall be mentioned at this point that the combined use of connection-oriented and connectionless data packet transmissions is known from JP 2000207298 A.

The packets of the second part are preferably consecutively numbered, checked for completeness based on the numbering thereof upon receipt of a plurality of packets, and missing packets are subsequently requested.

It is particularly advantageous if the additional data in the second part contains a recorded image of the license plate of the vehicle on which the license plate number read result is based. The recorded image can be used later for traffic offense enforcement purposes, however it is not critical for picking up violating vehicles based on license plate number read results and the locations of the violations. For this reason, the recorded image can be efficiently transmitted later by way of connectionless data packets, even in high-latency satellite networks.

The method of various embodiments is suited both for (DSCR) OBUs of the externally located type that already comprise a DSRC radio interface, and for (GNSS) OBUs of the self-locating type that additionally comprise a DSRC radio interface for control and setting purposes.

The number of control vehicles is preferably considerably higher than that of recording vehicles, in particular preferably higher by at least a power of ten.

The violations detected by the recording vehicle can include all types of toll or traffic violations that can be automatically detected, for example speeding violations detected by means of a speed measuring unit of the recording vehicle, bans on driving (including time-based bans) detected by means of a vehicle detection unit of the recording vehicle, and the like. The violations are preferably toll violations, and in particular such which can be ascertained based on a toll parameter that can be read out from the on-board unit via the DSRC radio interface. Such toll parameters can be arbitrary and provide information, for example, about the deployment purpose of the vehicle (for example emergency vehicle, means of public transportation, private vehicle, truck and the like), the status of the user of the vehicle, the size, weight, emission class, number of axles of the vehicle, or the relationship between the (user-specific) on-board unit and the physical vehicle (referenced via the license plate, for example) and the like. Any time a toll is calculated, be it during communication with a toll beacon or the calculation of toll transactions from reported positions, the toll parameters of the OBU are employed so as to determine the amount of the toll—or whether an obligation to pay the toll even exists.

Some embodiments may be characterized in that the detection in the recording vehicle takes place by reading out at least one toll parameter from the on-board unit via the DSRC radio interface and checking the toll parameter for accuracy.

In still a further aspect of some embodiments, the methods may relate specifically to checking vehicle shape-specific toll parameters. Such vehicle shape-specific parameters, which determine the amount of a road toll to be paid, can be, for example, the dimensions of the vehicle, the current number of axles (with or without trailer), a particular body design such as a truck or passenger car, and the like, and can be set or stored as toll parameters in an on-board unit. So as to detect abusive faulty settings of such toll parameters, the recording vehicle comprises a DSRC transceiver for reading out the toll parameter of a passing vehicle and a sensor for detecting a shape parameter of the vehicle, wherein the recording vehicle is configured to verify that the toll parameter is consistent with the shape parameter and, in case of inconsistency, to transmit the violation data record, including the location of the violation and the license plate number read result of the vehicle, to the violation server.

A particularly preferred variant of this embodiment is that the aforementioned additional data in the second data part contain a recorded image of the vehicle on which the detected shape parameter is based. This recorded image can also be used as evidence for enforcement purposes and is important, however not critical in terms of time for picking up the violating vehicles; it can therefore be sent in the second data part by way of wireless data packets, which are also suitable for high-latency satellite transmissions.

It is particularly advantageous if the connection-oriented transport protocol is a TCP (transmission control protocol), and the connectionless transport protocol is a UDP (user datagram protocol).

The packets of the first part preferably have a size of no more than 100 bytes. This makes them short enough to be transmitted undivided, which is to say as one packet, in connection-oriented protocols such as TCP; the risk of a deadlock due to the continual repetition of handshaking blocks in high-latency transmission channels, such as satellite connections, is thus low.

As described, the method according to some embodiments is suitable in particular for the operation with satellite communication systems, and the aforementioned transmission thus preferably takes place via a satellite connection.

As an alternative or in addition, the recording vehicle can be equipped with a unit for measuring the speed, and preferably the driving direction of a passing vehicle, so as to also determine the traffic or toll violation based on these measured values.

As described, the detected shape parameter or the read-out toll parameter can preferably be the vehicle length or number of axles, in particular broken down according to classes ("classified"). The shape parameter of a vehicle to be controlled can be detected in a wide variety of ways, for example using an electronic camera containing object recognition software, using a radar detector for vehicle measurement or detection of the wheels of the same, or preferably using a laser rangefinder or laser scanner, which detects at least a portion of the shape of the vehicle by scanning the same as it passes. A 2D or 3D image (profile or "point cloud" of laser distance measurement points) of at least a portion of the vehicle is created by the relative movement between the recording vehicle and the controlled vehicle, and based thereon the shape parameter can be obtained, for example by means of object recognition software, for example as a vehicle length or number of axles, based on which, for example, a conclusion can be drawn of a certain vehicle class (passenger car, truck, truck with trailer, and the like).

The recording vehicle can determine the location of the violation itself, for example by means of a satellite navigation receiver, or receive it directly from the on-board unit that is being checked, for example if the same comprises a dedicated position determination unit or learns of the position thereof in another manner, for example from a stationary radio beacon.

It is particularly advantageous if the recording vehicle is equipped with a unit for measuring the speed, and preferably the driving direction, of a passing vehicle, and adds these measured values to the violation data record. In this case, the violation server can also be configured to extrapolate a temporal change of the location of the violation based on the aforementioned measured values, so as to take this into consideration when checking whether a location of a violation is within the surroundings of a position at a particular time. This can increase the likelihood that a violating vehicle will be picked up by a control vehicle, by generating estimations of the movements of the violating vehicles and coordinating them with the positions of the control vehicles.

According to a further characteristic of some embodiments, the violation data record can also contain a time stamp and the violation server can be configured to take only violation data records into consideration that are within a predetermined time period. As an alternative or in addition, the control vehicle can be configured to discard violation data records that have time stamps outside a predetermined time range. This allows old data records to be automatically eliminated.

BRIEF DESCRIPTION OF THE FIGURES

Additional characteristics and advantages of some embodiments will be apparent from the following detailed description, which references the accompanying drawings, in which.

DETAILED DESCRIPTION

Figure 1:
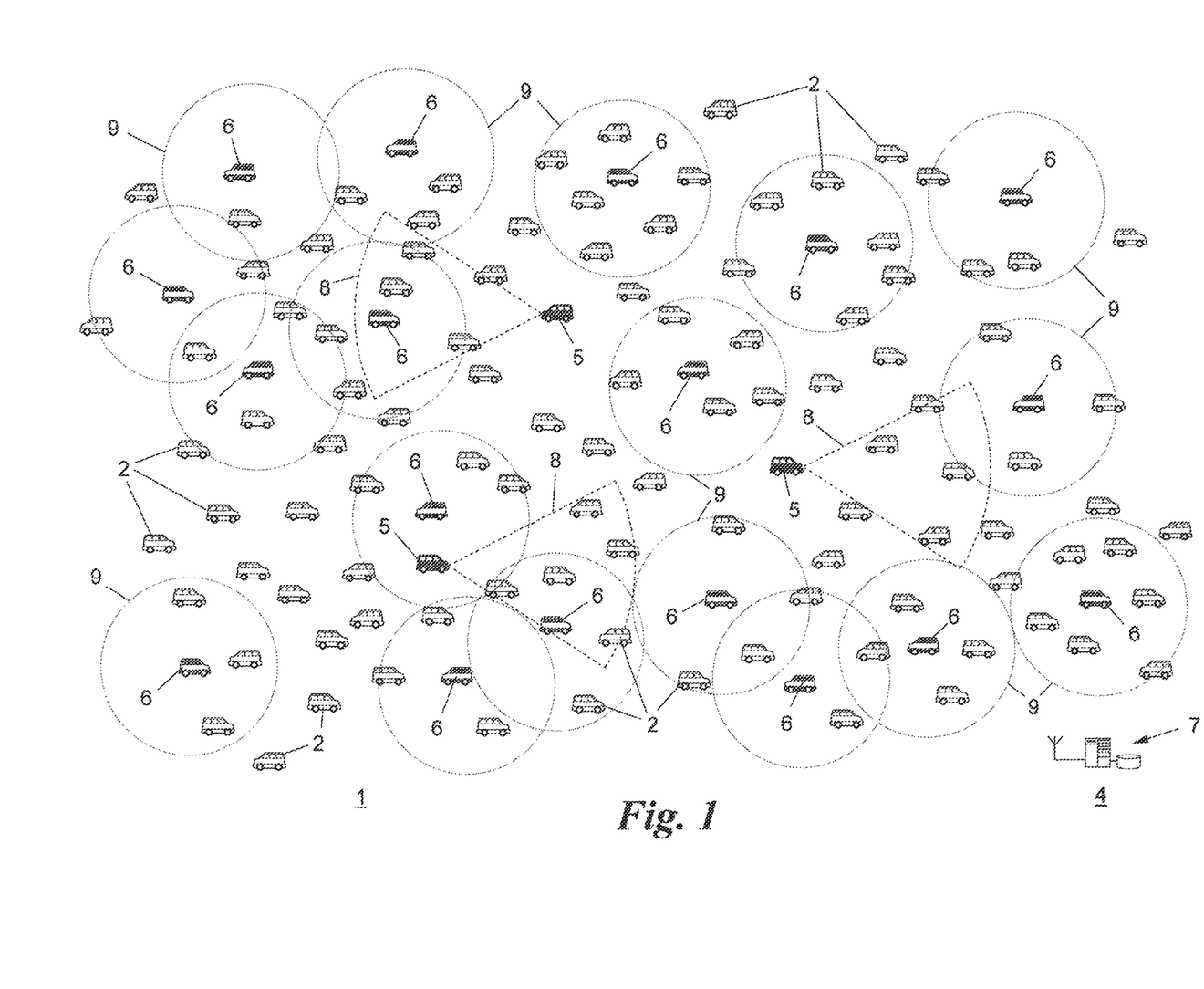
FIG. 1 shows a schematic overview of the operating principle of the control devices and of the control method in a vehicle population of a road system.

FIG. 1 is a schematic illustration of a road toll system 1, in which a plurality of vehicles 2 that are subject to tolls move about on a road system, which is not shown in detail, for example a nationwide road system. The road toll system 1 is used to charge tolls (fees) for arbitrary road usages by the vehicles 2, and more specifically both usages of traffic areas of moving traffic in form of roadway, territory, passage or border tolls, and of traffic areas of stopped traffic in form of visitation or parking fees.

Figure 2A:
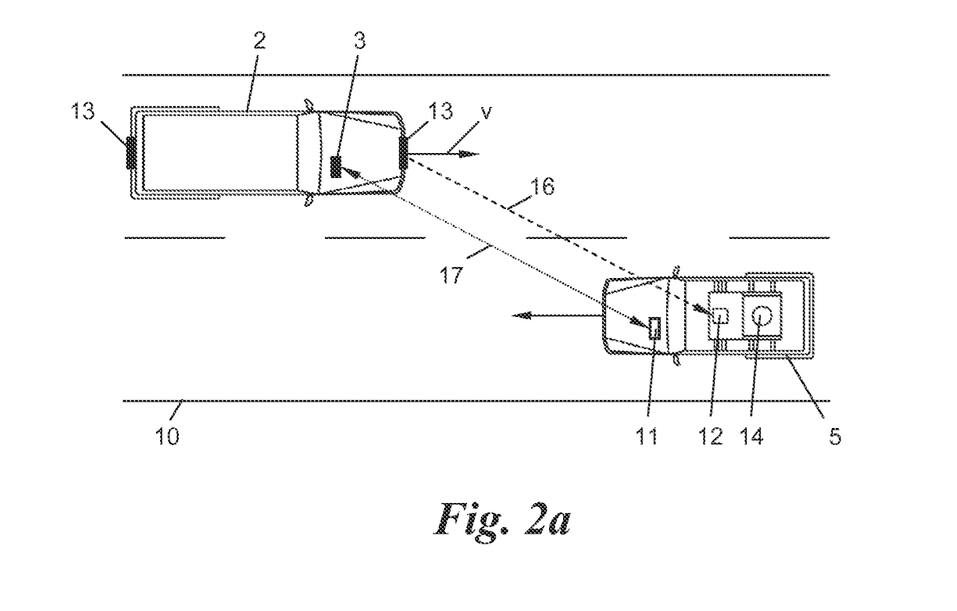
FIGS. 2a and 2b show different device components and method steps when a vehicle to be controlled passes a recording vehicle.
Figure 2B:
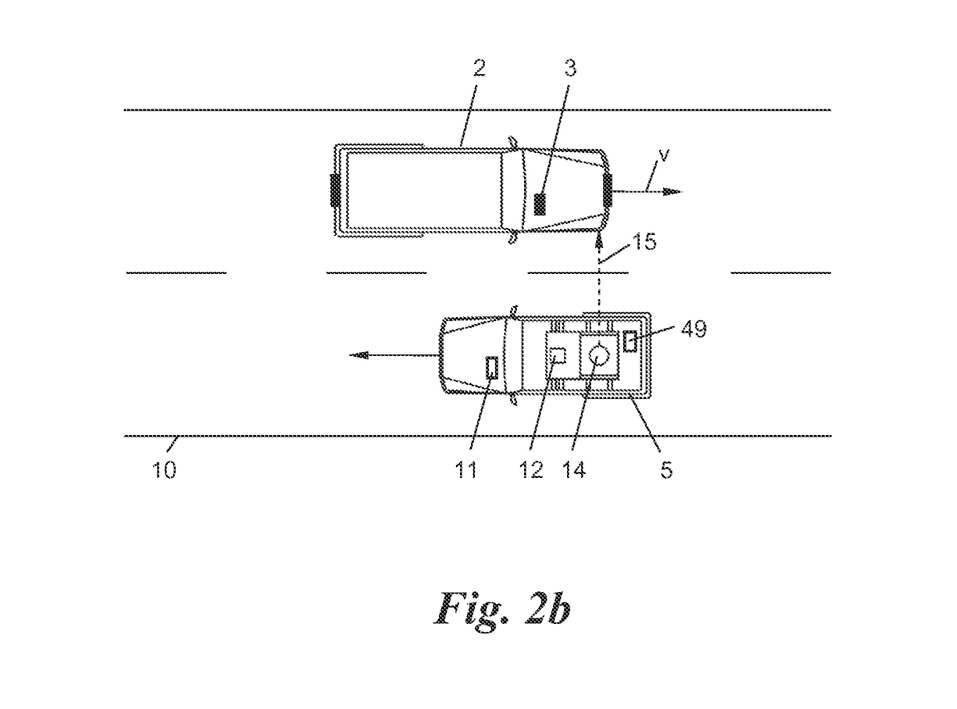
Figure 3A:
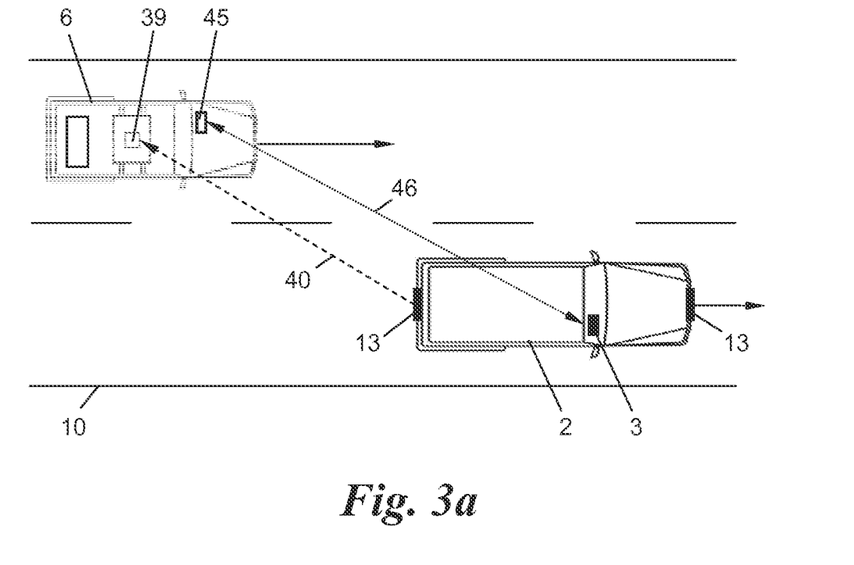
FIGS. 3a and 3b show different device components and method steps when a vehicle to be controlled passes a control vehicle.
Figure 3B:
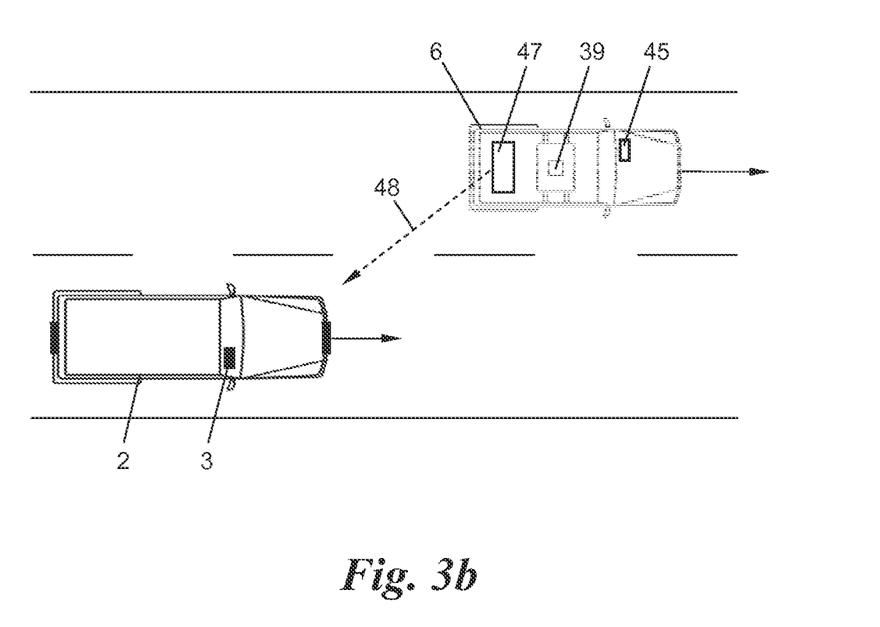

For this purpose, according to FIGS. 2 and 3 all vehicles 2 that are subject to tolls are equipped with on-board units (OBUs) 3, which can be used to locate the vehicles 2 and consequently they can be charged tolls. The OBUs 3 can take on a variety of designs: The OBUs 3 can be of the "self-locating" type, which is to say, they can continually determine the locations thereof themselves, for example by means of a satellite navigation receiver as part of a satellite navigation system (global navigation satellite system, GNSS) and report the locations thus determined ("position fixes") either directly to a back office 4 of the road toll system 1, be it via a mobile communication network or a network of geographically distributed radio beacons, or in the form of "abstracted" toll transactions, which are calculated based on the reported positions. As an alternative, such GNSS OBUs 3 could simply store the reported positions or toll transactions thereof, or debit the fees calculated based thereon from an internal toll credit account. The OBUs 3 can also be of the "externally located" type, for example using a plurality of toll or radio beacons which are geographically distributed over the road toll system 1 and which establish the respective short range communication or DSRC (dedicated short range communication) with passing OBUs 3 and localize the known beacon locations thereof due to the limited communication range. Corresponding reported positions, or toll transactions calculated based thereon, can then be generated by the OBUs 3 or the toll beacons and processed either in the OBUs 3 or in the back office 4.

So as to correctly calculate the toll in the road toll system 1, one or more toll parameters OC that are specific to the respective vehicle 2 are set or stored in the OBUs 3. The toll parameters OC can be of any arbitrary type and can, for example, provide information about the deployment purpose of the vehicle 2 (for example emergency vehicle, means of public transportation, private vehicle, truck and the like), the status of the user of the vehicle 2, about the size, weight, emission class, number of axles of the vehicle 2 with or without trailer, and the like. Any time a toll is calculated, be it during communication with a toll beacon or the calculation of toll transactions from reported positions, the toll parameters OC of the OBU 3 are employed so as to determine the amount of the toll—or whether an obligation to pay the toll even exists.

Hereafter, toll parameters OC that are considered include those which can be validated (cross-checked) by checking the exterior appearance, which is to say the shape of the vehicle 2 which carries the OBU 3. Such toll parameters OC are referred to as vehicle shape-specific in this description. Vehicle shape-specific toll parameters OC can, for example, include one or more dimensions of the vehicle 2, the body design thereof (boxy body, platform body, passenger car or truck body), number of axles, number of trailers, and the like.

The control devices and methods described hereafter are suitable for those OBUs 3, the vehicle shape-specific toll parameters OC of which set or stored therein can be read out via a DSRC radio interface, as is the case, for example, with DSRC OBUs according to the RFID, CEN-DSRC, UNI-DSRC, ITS-G5 or WAVE (wireless access in a vehicle environment) standards. GNSS OBUs 3, which additionally contain a DSRC radio interface for read-out of the toll parameters thereof for control purposes, are also suited and can be checked in the manner described below.

Moreover, the control devices and methods described herein are, of course, also able to ascertain whether a vehicle 2 that is subject to toll is even equipped with an OBU 3 and—since the read-out of toll parameters requires a correctly functioning OBU 3—check the functional capability of an OBU 3.

Finally, the described control devices and methods are also able to detect and enforce general traffic violations of the vehicles 2, such as speeding violations, transgressions of (night) driving bans and other traffic offenses, insofar as they can be automatically detected by means of measuring units, sensors and the like.

A control device is used in the road toll system 1 for the aforementioned control purposes, which is composed of a first fleet of recording vehicles 5, a second fleet of control vehicles 6, and a violation server 7 in the back office 4.

In some embodiments a considerably higher number of control vehicles 6 than recording vehicles 5 is provided. The ratio of the number of control vehicles 6 to recording vehicles 5 may be at least 10:1, and possibly 100:1, 1000:1 and more. As will be described below, control vehicles 6 have a simpler design than recording vehicles 5 and are operated with a different movement behavior, which results in a balanced coverage ratio of the spheres of action of recording and control vehicles at minimal costs. The recording vehicles 5 move continually in flowing traffic, and the interactions thereof with the vehicles 2 to be controlled are brief, while the control vehicles 6 can be used both in mobile and in stationary fashion and have longer interactions with the vehicles 2 being controlled if they conduct stop checks or enforce toll violations.

Figure 4:
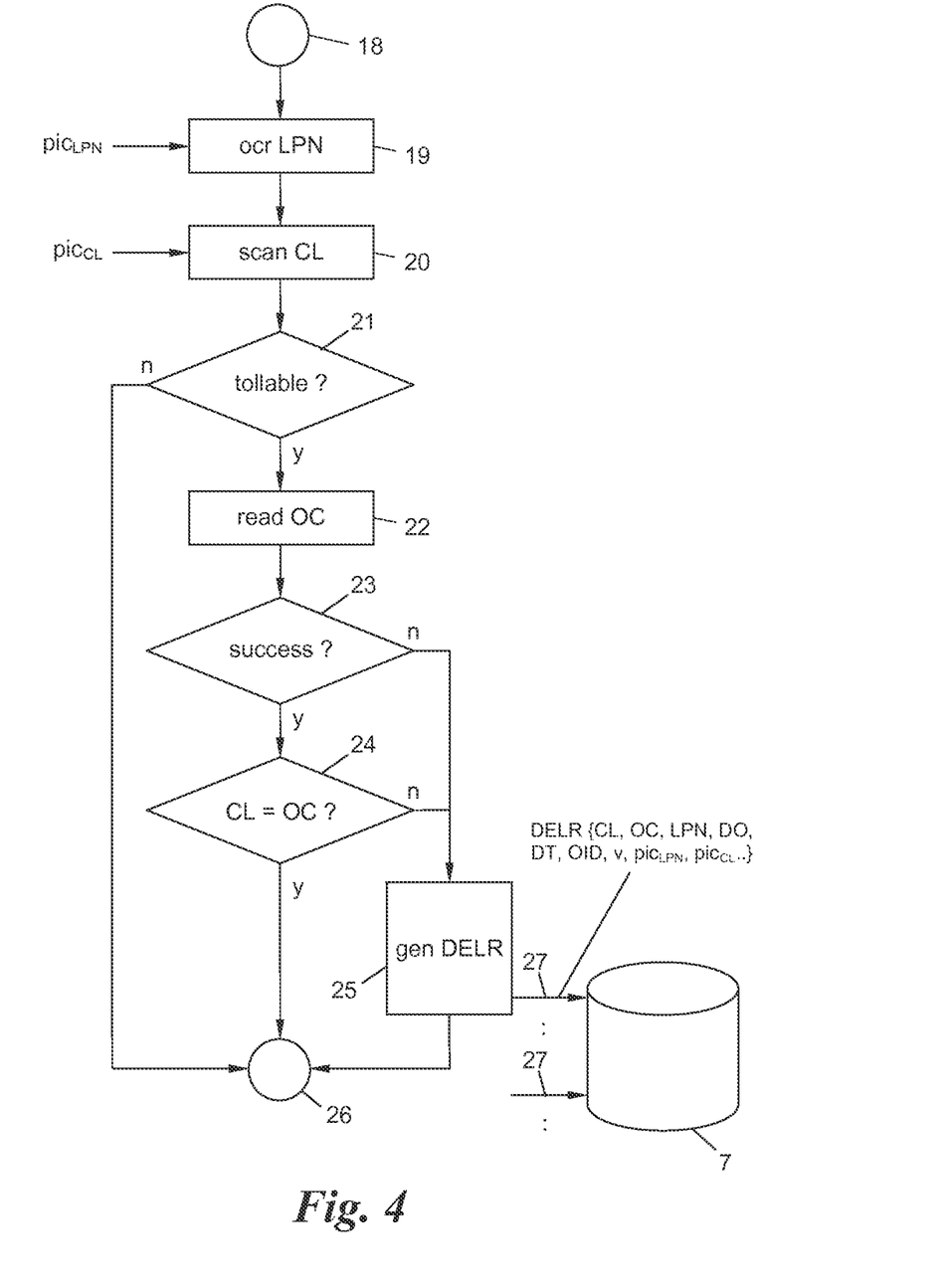
FIG. 4 is a flow chart of the part of the method that takes place in the recording vehicle.

As is shown in the overview in FIG. 1, the recording vehicles 5 are used to track down vehicles 2 that commit a traffic or toll violation, for example a speeding violation, or that contain a faulty or incorrectly set OBU 3, or none at all, in the respectively defined detection ranges, and transmit this information as a traffic or toll violation in form of a violation data record to the violation server 7; the interactions that take place for this purpose between the recording vehicle 5 and the vehicle 2 will be described in more detail hereafter based on FIGS. 2 and 4. The control vehicles 6 are used to check vehicles 2 that are located in the respective surroundings 9 with respect to the violation data records that are provided for these vehicles by the violation server 7 and to issue an alert message if a violation data record exists for a vehicle 2. The crew of the control vehicle 6 can then take the appropriate further verification and enforcement measures, for example stop the vehicle 2, conduct a traffic check, charge a subsequent toll, impose a fine and the like. The interactions that take place for this purpose between the control vehicle 6, the violation server 7 and the vehicle 2 will be described in more detail hereafter based on FIGS. 3 and 5.

The recording vehicles 5, the control vehicles 6, and the violation server 7 are connected to each other via a wireless network for this purpose, for example a mobile communication network, in particular a GSM, UMTS or LTE network, but also satellite-based mobile communication networks (for example iridium), and maybe by packet-switched connections. As an alternative, the system may utilize a network of geographically distributed radio beacons in the road toll system 1, for example a DSRC beacon, via which the recording and control vehicles 5, 6 can communicate whenever a beacon passes.

FIGS. 2a and 2b show one of the recording vehicles 5 in detail at two consecutive times as a vehicle 2 on a road 10 passes in opposing traffic. The recording vehicle 5 is equipped with a DSRC transceiver 11 for DSRC radio communication with the OBU 3 of the vehicle 2, a license plate number read unit 12 for automatically reading (optical character recognition, OCR) a license plate 13 of the vehicle 2, and a sensor 14, which here is a laser scanner, for detecting a parameter of the outside shape of the vehicle 2, which hereinafter is referred to as the shape parameter CL.

In the present example, the shape parameter CL is a vehicle class ("passenger car", "truck with two axles", "truck with three axles", "truck with four axles", "truck with trailer", and the like); however, of course any other property of the outside shape of the vehicle 2 which can be determined by way of the sensor 14 can serve as the shape parameter CL, similarly to the aforementioned vehicle shape-specific toll parameter OC.

The sensor 14 for detecting the shape parameter CL can be designed in any manner that is known from the prior art, for example in form of an electronic camera, which can record one or more images $pic_{CL}$ of the passing vehicle 2, including from different viewing angles, with these images $pic_{CL}$ then being used to extract corresponding properties and shape parameters of the vehicle 2 by means of image recognition software. As an alternative, the sensor 14 can be a radar or laser rangefinder or scanner, which scans the vehicle 2 as it passes using a radar or laser beam or fan 15 so as to detect one or more dimensions or contours of the passing vehicle 2 in form of a scanning profile of a scanning point cloud.

The license plate number read unit 12 of the recording vehicle 5 carries out an OCR read process, which is known from the prior art, on one (or more) recorded image(s) pic-OCR of an official license plate number LPN on the license plate 13 of the vehicle 2 ("automatic license plate number recognition", ALNR); the imaging path or information flow is shown schematically with the arrow 16.

The DSRC transceiver 11 of the recording vehicle 5 establishes DSRC radio communication 17 with the OBU 3 so as to a) ascertain whether an OBU 3 is even present in the vehicle 3, b) thereby (implicitly) check whether the OBU 3 responds, which is to say functions correctly, and c) read out the toll parameter OC set or stored in the OBU 3 for the further examination. During this examination, the read-out toll parameter OC of the OBU 3 should be consistent with the shape parameter CL of the vehicle 2 detected by the sensor 14. For example, if the toll parameter OC indicates "three-axle truck", the sensor 14 should also detect a shape parameter CL that is consistent therewith; if not, a toll violation exists and the vehicle 2 is a "violating vehicle".

Of course, a toll parameter OC that is read out from the OBU 3 can additionally be dependent on components other than the vehicle shape, for example the status or usage purpose of the vehicle 2, the time, the general temporal conditions (for example night driving ban), vehicle emission class restrictions, speeds, and the like, which can likewise be taken into consideration when checking the violation.

All components, these being the DSCR transceiver 11, license plate number read unit 12, and sensor 14, of the recording vehicle 5 are connected to each other—and via a controller in some embodiments (not shown)—and the recording vehicle 2 can, as described, communicate with the central violation server 7 wirelessly via a communication unit (not shown).

The operating principle of the recording vehicle 5 and the recording process that takes place when a vehicle 2 passes according to one embodiment will now be described in more detail with reference to FIGS. 2 and 4. When the vehicle 2 approaches the recording vehicle 5 (step 18), in a first step 19 the license plate number LPN of the vehicle 2 is read from the license plate 13 using a license plate number read unit 12 (arrow 16). The step 19 can also be carried out at any later time of the method of FIG. 4, as long as the license plate number read result LPN is not yet required, for example this can be done at a later time by reading the rear license plate 13 of the vehicle 2.

Subsequently, in a step 20, the shape parameter CL of the vehicle 2 is detected by way of the sensor 14, in the example shown this is done by laser scanning and detecting the number of axles of the vehicle 2, based on which an axle-based vehicle class ("class") is determined as the shape parameter CL.

In a subsequent decision step 21, it is checked based on the shape parameter CL whether or not the vehicle 2 is even subject to tolls. Two-axle vehicles 2, for example, can be defined as not being subject to tolls, and vehicles 2 with more than two axles can be defined as being subject to tolls. If the shape parameter CL indicates an obligation to pay tolls (branch "y"), in the subsequent step 22 contact is established with the OBU 3 using the DSRC transceiver 11 (arrow 17). The toll parameter OC is read out from the OBU 3 for this purpose, and a successful read-out also indicates that the OBU 3 is present and functioning. The subsequent decision step 23 then switches directly to step 25 for generating a violation data record DELR if the read-out fails (branch "n").

Otherwise (branch "y" of step 23), it is checked in the further decision 24 whether the detected shape parameter CL and the read-out toll parameter OC match or are consistent with each other, which is to say the toll parameter OC of the OBU 3 is set such that it corresponds to the shape parameter CL that has been detected based on the outside shape of the vehicle 3. If so (branch "y"), everything is fine and the method ends at 26. If not (branch "n"), an inconsistency exists, which constitutes a potential toll violation, and the process switches to step 25 for generating the violation data record DELR.

In step 25, the violation data record DELR is generated, which contains the detected shape parameter CL, the read-out toll parameter OC and the license plate number read result LPN, and, in some embodiments, other data such as the current location ("location of the violation") DO and the current time ("time of the violation") DT of the recording process, additional master data read out from the OBU 3 such as the OBU identifier OID, user master data, vehicle master data and the like.

The location of the violation DO can be determined in a wide variety of ways: The recording vehicle 5 can be equipped with a separate position determination unit, for example a satellite navigation receiver, and record the current location of the vehicle's passage as the location of the violation DO. As an alternative, the OBU 3, in particular if it is of the self-locating type, can make the current position thereof available to the recording vehicle 5 as the location of the violation DO. The known locations of neighboring radio beacons of a beacon-based road toll system 1 can also be used for approximation.

In the step 27, the violation data record DELR is then transmitted to the violation server 7 for further use by the control vehicles 6.

Of course steps 19 to 24—provided they do not require each other—can also be carried out in a different order.

The steps that take place in the violation server 7 and an exemplary control vehicle 6 according to one embodiment will be described based on FIGS. 3 and 5. FIGS. 3a and 3b show the situation as a control vehicle 6 passes a vehicle 2 to be controlled at two consecutive times. In preparation for (or during) such a check, the violation server 7 selectively provides the control vehicles 6 with those violation data records DELR that originate from violations in the respective surroundings 9 thereof.

For this purpose, every control vehicle 6 registers with its own position LOC (or directly with the surroundings 9 thereof) in the violation server 7 during a registration phase 28. The current position LOC (or surroundings 9) of the control vehicle 6 can be autonomously determined by the same, for example, in a position determination step 29, such as with the aid of a satellite navigation receiver, based on information from neighboring beacons, or the like. As an alternative, the position LOC or the surroundings 9 can also be manually entered by the user in an input unit of the control vehicle 6 in step 29.

During the subsequent registration step 30, the control vehicle 6 registers with the position LOC (or surroundings 9) thereof in the violation server 7, which opens a dedicated task 31 for every registered control vehicle 6.

Using the task 31, the violation server 7 can "filter" (phase 32) all violation data records DELR that have arrived in step 27, and those that arrive thereafter, in a location-specific manner. For this purpose, the violation server checks whether the location of the violation DO of a violation data record DELR is within the surroundings 9 of the position LOC of a control vehicle 6, and if so, it makes this violation data record DELR available to this control vehicle 6 (step 33). The control vehicle 6 adds the violation data records DELR provided with in this way to a local violation data record list locDELR 34.

The provision of the violation data records DELR, which have been filtered in a location-specific manner, in step 33 can take place both continually, for example periodically or as needed, for example in that the violation server 7 transmits each individual violation data record DELR to the control vehicle 6, or in batches (using batch processing), in that the control vehicle 6 picks up the violation data records DELR that are provided at a particular time from the violation server 7, or receives them transmitted from the server.

In embodiments with the time of the violation DT, the violation data records DELR also bear a respective "time stamp", which can limit the temporal validity of the messages. For example, violation data records DELR that are "too old", which is to say those having time stamps DT that are outside a predetermined time period, can be automatically discarded, both in the violation server 7 and in the control vehicle 6, and/or the violation server 7 can make available only "current" violation data records DELR to a control vehicle 6, which is to say those having time stamps DT that are within a predetermined time period.

During the registration phase 28, the control vehicles 6 thus basically "subscribe to" violation data records DELR from the surroundings 9 thereof, until, in a step 35, they transmit a de-registration request to the violation server 7, whereupon the same deletes the task 31.

The control vehicles 6 are thus provided with the respective current and location-specific violation data records DELR from the surroundings 9 thereof and can, when a vehicle 2 passes or is checked, carry out control tasks 36 which utilize the respective local violation data record list 34.

Figure 5:
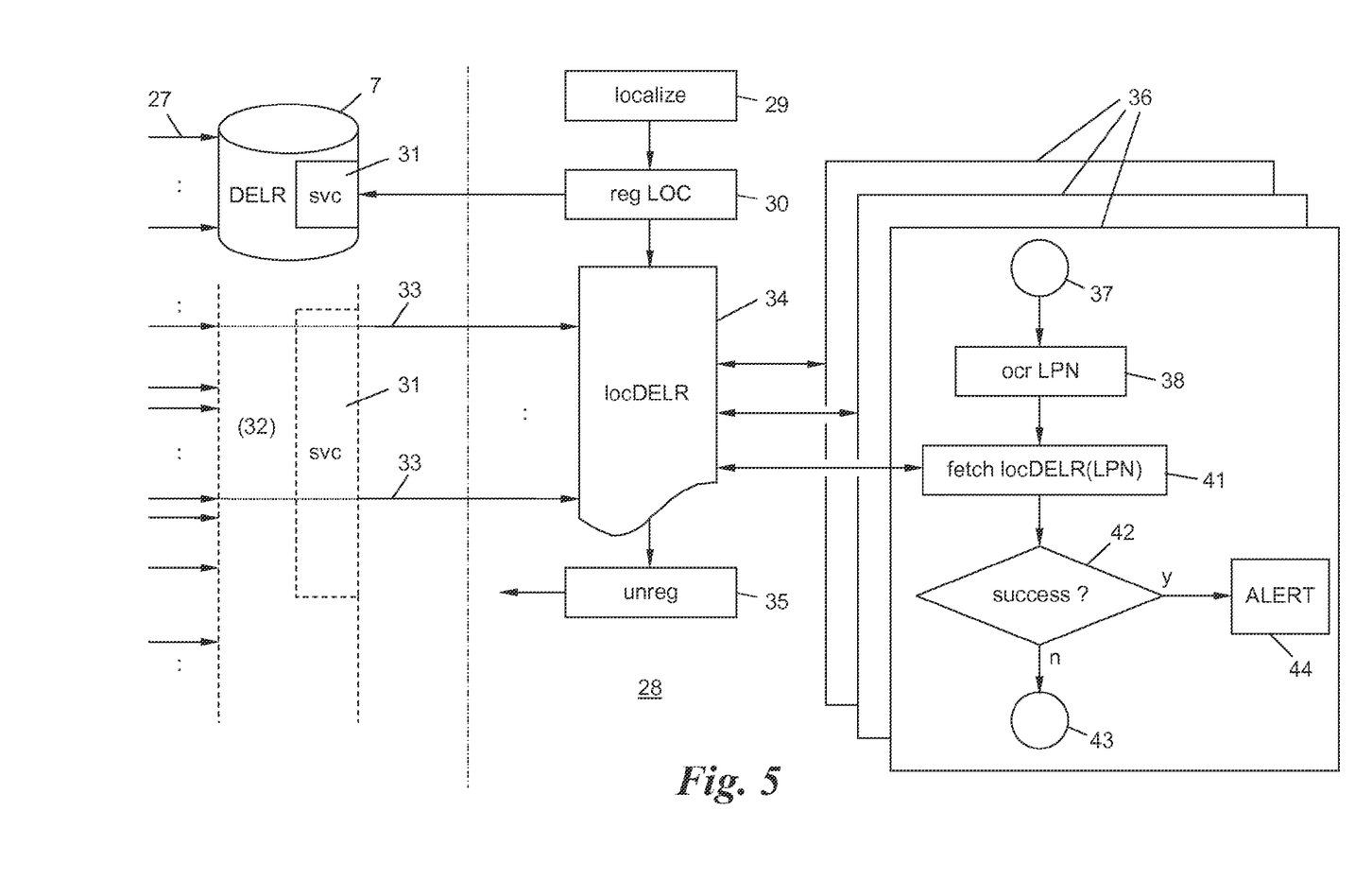
FIG. 5 is a flow chart of the parts of the method that take place in the violation server and in the control vehicle.

According to FIGS. 3 and 5, during every control task 36, as a vehicle 2 approaches (step 37), the license plate number LPN is automatically read in a first step 38 from the license plate 13 using a license plate number read unit 39 of the control vehicle 6 (arrow 40). Subsequently, in step 41, the control vehicle 6 picks a matching violation data record DELR from the local violation data record list 34, provided such a record exists. If no violation data record DELR exists for the license plate number read result LPN (branch "n" in checking step 42), the task 36 ends at 43, and the license plate number read result LPN can be deleted again, for example for confidentiality reasons. However, if a violation data record DELR exists for the license plate number read result LPN (branch "y"), the process branches off to the alert step 44, in which the control vehicle 6 issues an alert message to the crew.

The alert message can, for example, be an optical or acoustic alert, or a display on a screen, which also indicates the read license plate number LPN and the violation data record DELR. The crew can then take appropriate enforcement measures, for example stop the vehicle 2, further check the OBU 3, and in some embodiments levy a subsequent toll or impose a fine. The alert message can additionally be automatically displayed on a signaling system 47 of the control vehicle 6 which is outwardly visible for the checked vehicle 2 (arrow 48), so as to prompt the same to stop, for example, using fluorescent lettering "STOP", for example.

In some embodiments, in task 36 additionally the OBU 3 also be again read out using the DSCR transceiver 45 of the control vehicle 6 (arrow 46), for example for further consistency checks or identifications.

The violation server 7 can, in some embodiments, be equipped with estimation algorithms, which carry out an estimation of the temporal changes of the locations of the violations DO (as the "last whereabouts" of the violating vehicles 2), based on speeds and driving directions of the vehicles 2 that were measured when the violation was recorded. To this end, the recording vehicle 5 can be equipped with a unit 49 for measuring the speed and the driving direction, which is to say the movement vector v, of a vehicle 2. The unit 49 can also be implemented by a license plate number read unit 12 which is designed as a video camera and in the images of which movements can be detected, or by a DSRC transceiver 11 designed as a Doppler radar, or by appropriate measurements using the sensor 14, for example laser or LIDAR measurements on the scanning beam or fan 15.

The speed measuring systems 11, 12, 14, 49 of the recording vehicle 5 can moreover be used to detect general traffic violations of the vehicles 2, for example to detect speed violations.

The movement vector v of the vehicle 2 at the time of the violation DT can be integrated in the violation data record DELR and transmitted to the violation server 7. The violation server 7 can then extrapolate or estimate potential new whereabouts DO of the vehicle 2 for later times, also with the support of road system maps of the road system, and take this into consideration during phase 32 for those times at which the violation data records DELR that are relevant for the vicinity 9 of a control vehicle 6 are selected. Violation data records DELR of vehicles 2, the locations of violations DO of which were formerly outside the surroundings 9 of the position LOC of a control vehicle 6, can thus be within the surroundings 9 at a later time—on an extrapolated basis—and thus be made available to this control vehicle 6, or to the local violation data record list 34 thereof.

The surroundings 9 of the control vehicles 6 are thus dynamically adapted in terms of time. In addition, the surroundings 9 can be specifically adapted to the circumstances of the road system in which the control vehicle 6 moves about, so as to also take the movement of the same into consideration: The surroundings 9 are then no longer circles (as shown schematically in FIG. 1), but are dynamically adapted in accordance with the movements of a control vehicle 6 and the options of the same to make turns in the road system, for example they are adapted in an elliptic or tree-shaped manner, so as to always obtain the selection of those violation data records DELR from the violation server 7, and add to the local violation data record list IocDELR 34, which have the highest likelihood that the control vehicle 6 will encounter these violating vehicles 2 during the movement of the control vehicle. As an alternative, any arbitrary shapes of surroundings 9 can be predetermined.

Figure 6:
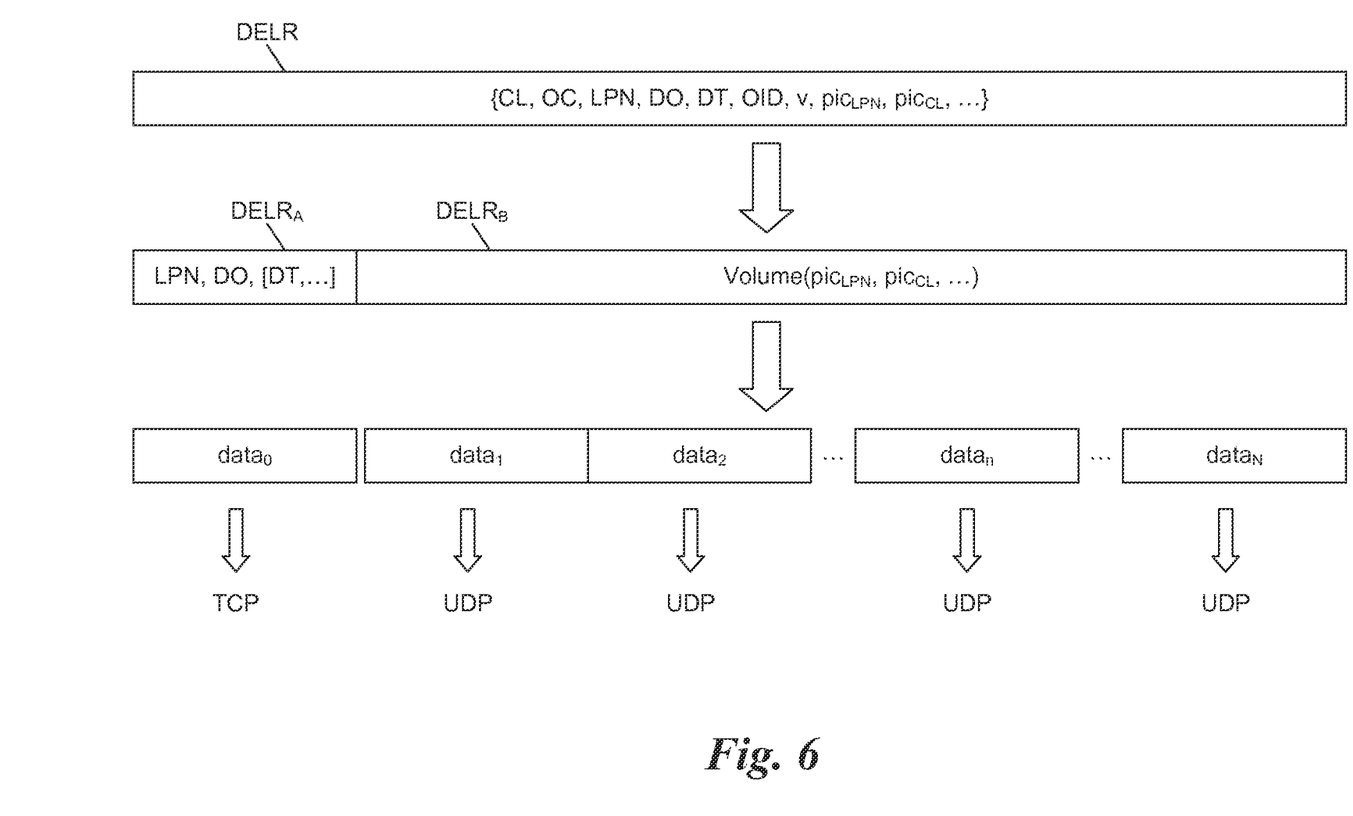
FIG. 6 shows the division of the violation data record during the transmission via a satellite connection.

According to FIG. 6, the steps 27 of transmitting the violation data record DELR from a recording vehicle 5 to the violation server 7 and/or the steps 33 of transmitting the violation data record DELR from the violation server 7 to a control vehicle 6 can be adapted over the course of the provision process 31 to 33 to high-latency wireless networks, such as satellite-based mobile communication networks, for example iridium, via which the recording vehicles 5, control vehicles 6 and violation server 7 are connected to each other.

For this purpose, each of the violation data records DELR is divided into a first part $DELR_A$, having a small data volume, and a second part $DELR_B$, having a large data volume. The first part $DELR_A$ contains the data that is absolutely necessary for the control tasks 36 of the control vehicles 6, in particular the license plate number read result LPN and the location of the violation DO, as well as, in some embodiments, the time of the violation DT, the OBU identifier OID and/or fundamental violation data, such as the violating vehicle speed v. The preferred size of the first part $DELR_A$ is several hundred bytes, and preferably no more than 100 bytes, so as to allow packet-switched data transmission via a connection-oriented packet-switched transport protocol in form of a single data packet $data_0$.

The second part $DELR_B$ contains the data for which there was no room in the first part $DELR_A$ and which is not critical in terms of time for picking up a violating vehicle in the control task 36, primarily large-volume image data, such as one (or more) recorded images $pic_{LPN}$ of the license plate number read unit 12, based on which the license plate number LPN was read, and/or one (or more) recorded images, scans, or the like, $pic_{CL}$ of the sensor 14, based on which the shape parameter CL was detected. The second part $DELR_B$ is intended for transmission in a packet-switched connectionless transport protocol and can be divided for this purpose into consecutive data packets $data_1, data_2, \ldots, data_n, \ldots, data_N$ (n=1 ... N). The packet size of the data packets $data_n$ of the second part $DELR_B$ is also preferably several hundred bytes, and particularly preferably approximately 100 bytes.

The packets $data_n$ are preferably consecutively numbered (here: with the index n) and are sent via a connectionless transport protocol, which has no confirmation mechanism (handshaking) for the individual packets, so that the sender can send the packets $data_n$ without awaiting a confirmation. The arriving data packets $data_n$ are collected in the receiver; upon receipt of a plurality of data packets $data_n$, the transmission can be checked for completeness based on the numbering n of the packets and any missing packets can be subsequently requested by the receiver from the sender.

Especially the TCP (transmission control protocol), as it is defined, for example, in the RFC 793, RFC 1233 standards and the Internet Engineering Task Force (IETF) standards that are based thereon and also forms the basis or part of today's Internet protocol (IP), is suitable as the connection-oriented transport protocol for sending the first part $DELR_A$ in form of a preferably single data packet $data_0$. The receiver confirms receipt of each TCP data package with respect to the sender.

Especially the UDP (user datagram protocol), as it is defined, for example, in the IETF RFC 768 standards and standards based thereon and also forms the basis and part of today's Internet protocol (IP), is suitable as the connectionless transport protocol for sending the second part $DELR_B$, which for this purpose is divided into individual data packets $data_n$. UDP data packets are not confirmed by the receiver with respect to the sender.

The described transmission steps 27 and 33 of a violation data record DELR can thus be split in terms of time, and more particularly into a first (confirmed) transmission of the part $DELR_A$ and several second data packets $data_n$ of the second part $DELR_B$, which the receiver only receives gradually, and potentially in transmissions that arrive out of order. The transmission of the first part $DELR_A$ is sufficient for the fundamental control functionality of the control tasks 36, especially for the determination step 41 as to whether a violation data record DELR exists in the violation server for a read license plate LPN. With respect to enforcing traffic offenses, the control vehicle 6 can then await full receipt of the second part $DELR_B$ of the violation data record DELR and can verify, for example check automatically on its own, whether the license plate read result LPN was read correctly and the toll parameter CL was detected correctly, for example based on the large-volume image data $pic_{LPN}$ and $pic_{CL}$ indicated in this second part, before a punitive measure is set with regard to the traffic violation.

The invention is not limited to the shown embodiments, but encompasses all variants and modifications that are covered by the scope of the accompanying claims.

In general, it should be understood that the circuits described herein may be implemented in hardware using integrated circuit development technologies, or yet via some other methods, or the combination of hardware and software objects that could be ordered, parameterized, and connected in a software environment to implement different functions described herein. For example, the systems may be implemented using a general purpose or dedicated processor device running a software application or program code stored in volatile or non-volatile memory devices. Devices so programmed may be used to perform the methods described herein. Also, the hardware objects could communicate using electrical signals, with states of the signals representing different data.

It should be further understood that these and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The invention claimed is:

1. A control method for a road toll system which is based on on-board units carried by vehicles, using at least one recording vehicle and at least one control vehicle, which can wirelessly communicate with a central violation server, the method comprising:
    in the recording vehicle:
        detecting a traffic or toll violation of an on-board unit or of a vehicle carrying the same and, if a violation exists,
        transmitting a violation data record, containing a determined location of the violation and a read license plate number of the vehicle, to a violation server;
    in the violation server:
        registering control vehicles, including positions or the surroundings thereof,
        receiving violation data records from recording vehicles and, if the locations of the violations thereof are within the surroundings of a position,
        providing the violation data records to a control vehicle that is registered with this position or these surroundings;
    in the control vehicle:
        registering the position or surroundings thereof in the violation server,
        reading the license plate number of a passing vehicle,
        determining a violation data record provided by the violation server for a read license plate number and, if such a record exists,
        issuing an alert message;
    wherein, during the transmission of a violation data record from the recording vehicle to the violation server and/or from the violation server to the control vehicle, the violation data record is divided into two parts, of which the first part contains at least the location of the violation and the license plate number read result, and the second part contains additional violation data, and the first part is transmitted via a connection-oriented and the second part is transmitted via a connectionless packet-switched transport protocol.

2. The method according to claim 1, wherein the packets of the second part are consecutively numbered, checked for completeness based on the numbering thereof upon receipt of a plurality of packets, and missing packets are subsequently requested.

3. The method according to claim 1, wherein the additional data in the second part contains a recorded image of the license plate of the vehicle on which the license plate number read result is based.

4. The control method according to claim 1, further comprising:
    in the recording vehicle:
        reading out a vehicle shape-specific toll parameter from an on-board unit of a passing vehicle by means of a DSRC transceiver,
        detecting a shape parameter of the vehicle by means of a sensor,
        checking the toll parameter for consistency with the shape parameter and, in case of inconsistency, transmitting a violation data record, including the location of the violation and license plate number read result of the vehicle, to the violation server.

5. The method according to claim 4, wherein the additional data in the second part contains a recorded image of the vehicle on which the detected shape parameter is based.

6. The method according to claim 1, wherein the connection-oriented transport protocol is TCP and the connectionless transport protocol is UDP.

7. The method according to claim 1, wherein the packets of the first part have a size of no more than 100 bytes.

8. The method according to claim 1, wherein the aforementioned transmission takes place via a satellite connection.

9. The method according to claim 1, wherein the speed, and preferably the driving direction, of a passing vehicle are measured in the recording vehicle and the traffic or toll violation is also determined based on these measured values.

10. The method according to claim 4, wherein the shape parameter and the toll parameter are a respective vehicle length or a respective number of vehicle axles.

11. The method according to claim 1, wherein the violation data record also contains a time stamp, and the violation server only takes violation data records into consideration containing time stamps within a predetermined time period and/or the control vehicle discards violation data records containing time stamps outside a predetermined time period.

12. The method according to claim 1, wherein the recording vehicle measures the speed, and preferably the driving direction, of a passing vehicle and adds these to the violation data record, and based thereon the violation server extrapolates a temporal change of the location of the violation, so as to take this into consideration when checking whether a location of a violation is within the surroundings of a position at a particular time.

* * * * *